Patented Mar. 30, 1943

2,315,402

UNITED STATES PATENT OFFICE 2,315,402

PROTEIN - MODIFIED AMINOTRIAZINE-FORMALDEHYDE CONDENSATION PRODUCTS

Gaetano F. D'Alelio, Pittsfield, Mass., assignor to General Electric Company, a corporation of New York No Drawing. Application October 19, 1940, Serial No. 361,977

17 Claims. (Cl. 260—6)

This invention relates broadly to resinous compositions. More particularly it is concerned with thermo-setting resins and molding (moldable) compositions comprising a soluble, fusible condensation product of a mixture comprising an aminotriazine (e. g., melamine), formaldehyde and a novel curing reactant, specifically a protein. The scope of the invention also includes products comprising the cured resinous compositions.

It has been known heretofore that aminotriazines can be condensed with formaldehyde under neutral, acid or alkaline conditions to yield soluble, fusible resinous condensation products. Such condensation products as ordinarily prepared have little time stability, that is, they advance rapidly toward an insoluble and infusible condition during the usual storage periods prior to use. The acid-catalyzed condensation products are particularly poor in time stability. The conventional alkaline-catalyzed aminotriazine-formaldehyde condensation products have better time stability than the acid-catalyzed products but frequently gel during storage prior to use or, in the case of the ammonia-catalyzed products, often gel during the condensation reaction. Aminotriazine-formaldehyde condensation products having good storage stability can be prepared by causing the condensation reaction between the aminotriazine and the aldehyde to take place in the presence of a primary condensation catalyst and a secondary condensation catalyst. To obtain such condensation products having good time- or storage-stability characteristics, I have found that the primary catalyst should be a member of the class consisting of (1) nitrogen-containing basic tertiary compounds that are aldehyde-non-reactable, e. g., tertiary amines such as trialkyl (for example, trimethyl, triethyl, etc.) amines, triaryl (for example, triphenyl, etc.) amines, etc., and (2) nitrogen-containing basic compounds that are aldehyde-reactable, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of primary catalyst, should be a fixed alkali, for instance a carbonate, cyanide or hydroxide of an alkali metal (e. g., sodium, potassium, lithium, etc.). Although such catalyzed aminotriazine-formaldehyde condensation products have good time stability, they are not curable in the absence of a curing agent to an insoluble, infusible state in any reasonable time and, therefore, their field of utility is limited. If curing catalysts of an acidic nature are incorporated into these condensation products, they can be cured under heat to an insoluble and infusible condition, but the addition of such acid bodies generally has a harmful effect upon the storage stability of the resin or molding composition made therefrom.

The present invention is based on my discovery that a protein, e. g., casein, constitutes an effective agent for the curing of potentially reactive (heat-curable) aminotriazine-formaldehyde condensation products and molding compositions prepared from such products. Although not limited to the curing of potentially reactive aminotriazine-formaldehyde condensation products obtained with the aid of any specific condensation catalyst, I have found that a protein, especially when co-condensed or inter-condensed with the other reactants, is particularly effective in accelerating the conversion to an insoluble, infusible state, under heat or under heat and pressure, of those soluble, fusible condensation products obtained by reaction of an aminotriazine and formaldehyde while admixed with a primary and a secondary catalyst of the kinds above described.

This invention provides potentially reactive (heat-convertible) aminotriazine-formaldehyde resins and molding compositions that require no curing accelerator of the admixed-catalyst type, or other curing reactant, in order to obtain technically useful products. In these new compositions of matter comprising heat-curable aminotriazine-formaldehyde condensation products internally modified (chemically united) with a protein or a degradation product thereof, the whole resin molecule including the protein curing reactant that is an integral part thereof cures (hardens) under heat or under heat and pressure to an insoluble, infusible state.

Compositions comprising a soluble, fusible condensation product of a mixture comprising essentially an aminotriazine, formaldehyde and a protein (usually in relatively small amount) have excellent storage stability as compared with those compositions otherwise the same but containing a curing catalyst of an acidic nature in place of a protein. The protein-containing compositions cure rapidly under heat or under heat and pressure to an insoluble, infusible state. The cured products have high resistance to heat, moisture and arcing, have high mechanical strength, good surface finish and, in general, are wholly suited for all the service applications for which products of this general class are used. These results were quite surprising and unexpected, since in no way could it have been predicted from the known properties of proteins and of potentially reactive aminotriazine-formaldehyde condensation products that a protein would function as an accelerator of curing when incorporated into such condensation products. The results are all the more surprising when it is considered that proteins such, for example, as casein are not effective agents for the curing of such closely related condensation products as, for instance, urea-formaldehyde and thiourea-formaldehyde condensation products.

In order that those skilled in the art better may understand how the present invention may be carried into effect, the following illustrative examples thereof are given. All parts are by weight.

Example 1

| | Parts by weight |
|---|---|
| Melamine | 252.0 |
| Aqueous solution of formaldehyde (approx. 37.1% HCHO) | 560.0 |
| Aqueous ammonia (28% NH$_3$) | 12.0 |
| Sodium hydroxide in 120 parts water | 0.48 |
| Casein | 10.0 |

All of the above components with the exception of the casein were mixed and heated at boiling temperature under reflux for 10 minutes. The stated amount of casein was now incorporated into the resin syrup together with 267 parts alpha cellulose in flock form and 1 part of a mold lubricant, specifically zinc stearate. The resulting mass was heated at 67° C. for 105 minutes in order to dry the mass and simultaneously with drying to intercondense the casein with the melamine-formaldehyde partial condensation product. The dried composition was molded for 3 minutes at 130° C. under a pressure of 2,000 pounds per square inch. The molded piece was hard, mechanically strong, had a good surface finish, excellent gloss, could be pulled hot from the mold without distortion, and was well cured throughout as evidenced by the fact that it did not swell or disintegrate or show any other signs of being attacked when immersed in boiling water for 15 minutes.

When casein is omitted from the above formulation, but the procedure otherwise is identically the same, uncured molded articles having no commercial utility are obtained.

When an equivalent amount of urea is substituted for the melamine in the above formula, molded articles that readily are attacked by boiling water are obtained, showing that the resin has not cured to an insoluble, infusible state.

Although undegraded proteins do not materially accelerate the curing of condensation products of, for example, urea and formaldehyde, thiourea and formaldehyde, etc., to an insoluble and infusible condition, I have surprisingly found that when an aminotriazine, specifically melamine, is one of the starting reactants in addition to urea or equivalent material, then for some unexplainable reason the protein is able to accelerate the curing of the resulting condensation product. For optimum results in the curing of such mixed or co-condensation products with a protein, the amount of aminotriazine should be at least 25 mol per cent of the molar amount of urea, thiourea, dicyandiamide or other material which when condensed with formaldehyde in the absence of an aminotriazine yields a protein-non-curable, soluble, fusible condensation product. Preferably I use at least 0.4 mol of the aminotriazine, specifically melamine, for each mol of urea or equivalent material. Obviously higher amounts may be employed, for example from equimolecular proportions of aminotriazine and urea or its equivalent to from 10 to 100 mols of the aminotriazine for each mol of urea or equivalent material. This modification of the invention will be understood more clearly from a consideration of the following examples:

Example 2

| | Parts by weight |
|---|---|
| Melamine | 315.0 |
| Urea | 150.0 |
| Aqueous solution of formaldehyde (approx. 37.1% HCHO) | 1000.0 |
| Aqueous ammonia (28% NH$_3$) | 30.0 |
| Sodium hydroxide in 30 parts water | 0.6 |
| Casein | 19.0 |

All of the above components with the exception of the casein were heated under reflux for 15 minutes. The resulting resin syrup was mixed with the stated amount of casein, 475 parts alpha cellulose in flock form and 4 parts zinc stearate. The resulting mass was heated at 75° C. for 90 minutes in order to dry the mass and simultaneously with drying to intercondense the casein with the melamine-urea-formaldehyde partial condensation product. The dried composition was molded for 2 minutes at 130° C. under a pressure of 2,000 pounds per square inch. The molded piece was hard, mechanically strong, had a good surface finish, could be pulled hot from the mold without distortion, and was well cured throughout.

Example 3

| | Parts by weight |
|---|---|
| Melamine | 315.0 |
| Thiourea | 190.0 |
| Aqueous solution of formaldehyde (approx. 37.1% HCHO) | 1000.0 |
| Aqueous ammonia (28% NH$_3$) | 30.0 |
| Sodium hydroxide in 30 parts water | 0.6 |
| Casein | 1.95 |

Exactly the same procedure was followed as described under Example 2 with the exception that 490 parts alpha cellulose in flock form were employed instead of the 475 parts used in making the molding composition of Example 2. The molded articles of this example were well cured throughout and otherwise were much the same in their properties as the product of Example 2.

Example 4

| | Parts by weight |
|---|---|
| Melamine | 472.5 |
| Dicyandiamide | 105.0 |
| Aqueous solution of formaldehyde (approx. 37.1% HCHO) | 1200.0 |
| Aqueous ammonia (28% NH$_3$) | 30.0 |
| Sodium hydroxide in 30 parts water | 0.6 |
| Casein | 3.05 |

All of the above components with the exception of the casein were heated under reflux for 15 minutes. The resulting resin syrup was mixed with the stated amount of casein, 610 parts alpha cellulose in flock form and 4 parts zinc stearate. The resulting mass was dried in air at room temperature, after which it was molded for 5 minutes at 140° C. under a pressure of 2,000 pounds per square inch. The molded piece was hard and well cured throughout.

Although in the foregoing examples I have shown the protein as being incorporated into the resinous mass at the same time the resin syrup is being compounded with a filler and a mold lubricant, I am not limited to this specific procedure. For example, the protein may be added to the reaction vessel along with the other reactants and all the components heated together from the beginning to effect reaction therebetween. Or, all the components with the exception of the protein may be heated together for a short time under reflux, the protein added to the partial condensation product thereby obtained, and the resulting mass heated for an additional period of time under reflux prior to incorporating a filler therewith. Or, the protein may be mixed with the components (fillers, plasticizers, mold lubricants, etc.) of the molding composition at any convenient stage in the preparation of such compositions.

The amount of protein which is incorporated into the resin or into the molding composition may vary considerably, depending largely upon the particular curing rates desired. In general, however, only a relatively small amount of protein is used and, preferably, not exceeding substantially one-tenth mol of a protein (or a degradation product of a protein) per mol of aminotriazine, e. g., melamine, or per mol of aminotriazine and other formaldehyde-reactable starting component, if any such last-named components are employed in conjunction with the aminotriazine in producing the heat-curable condensation product.

While I have described my invention with particular reference to formaldehyde as the aldehydic reactant, obviously compounds engendering formaldehyde also may be employed, for example, paraformaldehyde, hexamethylene tetramine, etc. For some applications I may use formaldehyde (or a compound engendering formaldehyde) together with other aldehydes, e. g., acetaldehyde, propionaldehyde, butyraldehyde, acrolein, methacrolein, crotonaldehyde, benzaldehyde, furfural, etc. Protein-modified condensation products of an aminotriazine and an aldehyde other than formaldehyde may be produced, but such condensation products do not usually cure with the rapidity required in the production of molded articles by the present-day molding technique.

In carrying the present invention into effect the initial condensation reaction between the formaldehyde (or equivalent material) and the aminotriazine (or mixture comprising an aminotriazine and one or more aldehyde-reactable organic compounds, e. g., urea, thiourea, dicyandiamide, malonic diamide, itaconic diamide, maleic diamide, etc.) may be carried out under acid, neutral or alkaline conditions, at atmospheric, sub-atmospheric or super-atmospheric pressure, and in the presence or absence of a solvent for the initial condensation product. I prefer to form the resin initially under alkaline conditions, that is, at a pH above 7.0. More particularly, I prefer to form the initial condensation product by causing an aminotriazine, e. g., melamine, and formaldehyde to react while admixed with a primary and a secondary condensation catalyst such as hereinbefore described, specifically a condensation catalyst comprising ammonia and a fixed alkali, e. g., sodium hydroxide. Various mol ratios of reactants may be employed as desired or as conditions may require, but the proportions usually are within the range of 1 mol aminotriazine to from 1 to 6 or 7 mols formaldehyde. For example, in producing a potentially reactive, protein-modified melamine-formaldehyde condensation product I advantageously may use 1 mol melamine to from 1½ to 3¼ mols formaldehyde.

Illustrative examples of aminotriazines that may be employed in producing the condensation products of this invention are triazines containing at least one amino group, e. g., melamine, ammeline, ammelide, formoguanamine, 2-amino-1,3,5-triazine and their substitution products, etc. Derivatives of melamine also may be employed, e. g., 2,4,6-trihydrazino-1,3,5-triazine, melam, melem, melon, 2,4,6-triethyltriamino-1,3,5-triazines, 2,4,6-triphenyltriamino-1,3,5-triazines, etc. Nuclearly substituted aminotriazines also may be used, e. g., 1-cyano-2-amino-4,6-dimethyl-1,3,5-triazine, 2-chloro-4,6-diamino-1,3,5-triazine, 6-methyl-2,4-diamino-1,3,5-triazine, 2-alkyl-4-amino-6-hydroxy-1,3,5-triazines (for example, 2-methyl-4-amino-6-hydroxy-1,3,5-triazine, etc.), 2-aryl-4-amino-6-hydroxy-1,3,5-triazines (for example, 2-phenyl-4-amino-6-hydroxy-1,3,5-triazine, etc.), and the like. Suitable mixtures of aminotriazines also may be employed.

Illustrative examples of proteins and degradation products of proteins that may be used are the so-called "simple proteins," that is, protein substances which yield only alpha-amino acids or their derivatives on hydrolysis, e. g., the albumins, the globulins, the glutelins, the prolamines (e. g., zein from corn, gliadin from wheat, hordein from barley, etc.), the albuminoids, the histones, the protamines, etc.; the conjugated proteins such, for example, as the nucleoproteins, the glycoproteins, the phosphoproteins, the hemoglobins, the lecithoproteins, etc.; the derived proteins, for example, the primary protein derivatives, the metaproteins, etc.; the secondary protein derivatives, for example, the proteoses, the peptones, the peptides, etc. Albumoses, propeptones, peptones and polypeptides are complex degradation products of proteins. More specific examples of proteins that may be employed are legumin, gelatin, the keratins, which are the chief constituents of hair, nails, horn, hoofs, etc., egg albumin, blood albumin, serum globulin, collagens, elastin, fibroin, globin, caseinogen, proteins from soya bean, etc.

Although I have described my invention with particular reference to the production of a protein-modified condensation product of a mixture comprising an aminotriazine and formaldehyde, with or without other addition agents such, for example, as urea, thiourea, dicyandiamide, etc., it will be understood, of course, that other modifying bodies may be introduced into the resin before, during or after effecting condensation between the primary components. Thus, as modifying bodies I also may use, for example, monohydric alcohols such as ethyl, propyl, isopropyl, butyl, amyl, etc., alcohols; polyhydric alcohols such as ethylene glycol, diethylene glycol, glycerol, pentaerythritol, trimethylol nitro methane, etc.; mono- and poly-amides; amines; phenols; aminophenols; ketones; etc. The modifying bodies also may take the form of high molecular weight bodies, with or without resinous characteristics, for example lignin, partially hydrolyzed wood products, protein-aldehyde condensation products, phenol-aldehyde condensation products, polyhydric alcohol-polybasic acid condensation products, natural gums and resins, etc. Dyes, pigments, plasticizers, mold lubricants, opacifiers and various fillers (e. g., wood flour, glass fibers, asbestos including defibrated asbestos, mineral wool, mica, cloth cuttings, etc.) may be compounded with the resin in accordance with conventional practice to produce molding compositions best fitted to yield molded articles of optimum properties for the particular service application.

The molding compositions of this invention may be molded into a wide variety of shapes under heat and pressure, more particularly at temperatures of the order of 100° to 200° C. For optimum results I prefer to use temperatures ranging from approximately 120° to 180° C. Molding pressures may be varied considerably, but usually are within the range of 1,000 to 10,000 pounds per square inch, more particularly from about 2,000 to 4,000 or 5,000 pounds per square inch.

From the foregoing description it will be seen that the present invention provides new and useful compositions of matter comprising a condensation product of a mixture comprising an aminotriazine, formaldehyde and a protein; also, compositions comprising the product of reaction of (1) a protein and (2) the soluble, fusible condensation product of a mixture comprising an aminotriazine, specifically melamine, and formaldehyde, wherein the condensation reaction between the aminotriazine and the formaldehyde are carried out under particular conditions, for example, in the presence of a condensation catalyst comprising ammonia and a fixed alkali. The invention also provides a method of preparing new resinous compositions which comprises causing to react to resin formation a mixture comprising an aminotriazine, formaldehyde and a protein. Products of the invention include heat-curable compositions comprising a potentially reactive, protein-modified condensation product of a mixture comprising melamine and formaldehyde, which mixture also may include other components such, for example, as urea, thiourea, dicyandiamide, etc. The scope of the invention also includes products comprising cured compositions obtained by curing heat-curable compositions such as those just described, more particularly molded articles of manufacture comprising the insoluble and infusible resinous condensation product of a mixture comprising an aminotriazine, formaldehyde and a protein.

The present invention also provides new and useful thermosetting molding compositions comprising a soluble, fusible aminotriazine-formaldehyde condensation product having a protein incorporated therein, specifically a soluble, fusible condensation product of a mixture comprising melamine, formaldehyde and a protein, said protein being present in an amount not exceeding substantially one-tenth mol of protein per mol of melamine. Also included within the scope of the invention is a method of curing a potentially reactive condensation product of a mixture comprising an aminotriazine and formaldehyde, which method comprises incorporating into the said condensation product a small amount of a protein, and subjecting the resulting composition to a temperature of the order of 100° to 200° C. until the said condensation product has cured to an insoluble and infusible state.

The modified and unmodified resinous compositions of this invention have a wide variety of uses. For example, in addition to their use in the production of molding compositions they may be employed as laminating varnishes in the production of laminated articles wherein sheet materials, e. g., paper, cloth, sheet asbestos, etc., are coated and impregnated with the resin, superimposed, and thereafter united under heat and pressure. They also may be used in making protective surfacing materials, for example paints, varnishes, etc., in the manufacture of arc-extinguishing tubes capable of evolving an arc-extinguishing gas under the heat of the arc, in the production of wire or baking enamels, and for bonding or cementing together mica flakes to form a laminated mica article. They also may be used as anti-creasing agents, as impregnants for electrical coils and other electrical devices, and for other purposes. The cured resinous products have excellent resistance to heat, water and moisture, have a high dielectric strength and outstanding arc resistance. Hence they are particularly suitable for electrically insulating and other uses where such properties are highly desirable.

What I claim as new and desire to secure by Letters Patent of the United States is:

1. A composition of matter comprising a condensation product of a mixture comprising an aminotriazine, formaldehyde and a protein in a small amount not exceeding substantially one-tenth mol of protein per mol of aminotriazine.

2. A composition as in claim 1 wherein the protein is casein.

3. A heat-curable composition comprising a potentially reactive condensation product of ingredients comprising melamine and formaldehyde, said condensation product having incorporated therein a protein in a small amount not exceeding substantially one-tenth mol of protein per mol of the melamine component of the said condensation product.

4. A product comprising the cured composition of claim 3.

5. A composition of matter comprising a condensation product of ingredients comprising melamine, formaldehyde and casein in a small amount not exceeding substantially one-tenth mol of casein per mol of the melamine component of the said condensation product.

6. A composition comprising the product of reaction under heat of (1) a soluble, fusible condensation product obtained by reaction of a mixture comprising melamine and formaldehyde, the condensation reaction between the melamine and formaldehyde being carried out in the presence of a condensation catalyst comprising ammonia and a fixed alkali, and (2) a protein in a small amount not exceeding substantially one-tenth mol of protein per mol of the melamine component of the condensation product of (1).

7. A heat-curable composition comprising a potentially reactive condensation product of ingredients comprising melamine, urea and formaldehyde, said condensation product having incorporated therein a protein in a small amount not exceeding substantially one-tenth mol of protein per mol of the sum of the melamine and urea components of the said condensation product.

8. A product comprising the cured composition of claim 7.

9. A heat-curable composition comprising a potentially reactive condensation product of ingredients comprising melamine, thiourea and formaldehyde, said condensation product having incorporated therein a protein in a small amount not exceeding substantially one-tenth mol of protein per mol of the sum of the melamine and thiourea components of the said condensation product.

10. A product comprising the cured composition of claim 9.

11. A heat-curable composition comprising a potentially reactive condensation product of ingredients comprising melamine, dicyandiamide and formaldehyde, said condensation product having incorporated therein a protein in a small amount not exceeding substantially one-tenth mol of protein per mol of the sum of the melamine and dicyandiamide components of the said condensation product.

12. A product comprising the cured composition of claim 11.

13. A thermosetting molding composition comprising a filler and a soluble, fusible aminotriazine-formaldehyde condensation product having incorporated therein a protein in a small amount not exceeding substantially one-tenth mol of protein per mol of the aminotriazine component of the said condensation product.

14. A thermosetting molding composition comprising a filler and a soluble, fusible condensation product of a mixture comprising melamine, formaldehyde and a protein, said protein being present in a small amount not exceeding substantially one-tenth mol of protein per mol of melamine.

15. A molded article of manufacture comprising the insoluble and infusible resinous condensation product of a mixture comprising an aminotriazine, formaldehyde and a protein in a small amount not exceeding substantially one-tenth mol of protein per mol of aminotriazine.

16. The method of preparing new resinous compositions which comprises heating to resin formation the components of a mixture comprising an aminotriazine, formaldehyde and a protein in a small amount not exceeding substantially one-tenth mol of protein per mol of aminotriazine.

17. The method of curing a potentially reactive condensation product of a mixture comprising an aminotriazine and formaldehyde which comprises incorporating into the said condensation product a protein in a small amount not exceeding substantially one-tenth mol of protein per mol of aminotriazine, and subjecting the resulting composition to a temperature of the order of 100° to 200° C. until the said condensation product has cured to an insoluble and infusible state.

GAETANO F. D'ALELIO.

CERTIFICATE OF CORRECTION.

Patent No. 2,315,402.　　　　　　　　　　　　　　　　March 30, 1943.

GAETANO F. D'ALELIO.

It is hereby certified that error appears in the printed specification of the above numbered patent requiring correction as follows: Page 3, first column, line 58, for "one or more aldehyde-reactable" read --one or more other aldehyde-reactable--; page 4, second column, lines 50 and 51, claim 6, for "mixtude" read --mixture--; and that the said Letters Patent should be read with this correction therein that the same may conform to the record of the case in the Patent Office.

Signed and sealed this 25th day of May, A. D. 1943.

Henry Van Arsdale,
(Seal)　　　　　　　　　　　　　　　Acting Commissioner of Patents.